United States Patent [19]

Karns

[11] Patent Number: 4,664,489
[45] Date of Patent: May 12, 1987

[54] AUXILIARY MIRROR SYSTEM

[76] Inventor: John L. Karns, 816 Inverness Rd., Fort Collins, Colo. 80524

[21] Appl. No.: 855,603

[22] Filed: Apr. 24, 1986

[51] Int. Cl.⁴ .......................... B60R 1/06; G02B 7/18; G02B 1/08
[52] U.S. Cl. .................................. 350/631; 350/626; 350/612; 248/475.1; D12/187
[58] Field of Search ............... 350/631, 632, 626, 612, 350/606; 248/475.1, 476; D12/187

[56] References Cited

U.S. PATENT DOCUMENTS

| D. 204,188 | 3/1966 | Lee et al. ............................ D12/187 |
| 3,778,016 | 12/1973 | Gernhardt et al. .............. 248/475.1 |
| 4,504,118 | 3/1985 | Harig ................................... 350/626 |

Primary Examiner—Jon W. Henry
Attorney, Agent, or Firm—Dean P. Edmundson

[57] ABSTRACT

An auxiliary mirror system is described which can be detachably mounted to a vehicle having a primary mirror secured to the vehicle by means of a frame. The auxiliary mirror system is very useful, for example, when it is necessary to haul or tow very wide objects. The auxiliary mirror system can be easily and quickly attached to the frame of the primary mirror. The auxiliary mirror is held very securely in place when used, i.e., there is no danger of the mirror slipping or falling after it has been attached. When the auxiliary mirror is not needed it may be quickly and easily detached.

19 Claims, 4 Drawing Figures

AUXILIARY MIRROR SYSTEM

FIELD OF THE INVENTION

This invention relates to auxiliary mirrors. More particularly, this invention relates to auxiliary rear view mirror systems for use on trucks or other vehicles.

BACKGROUND OF THE INVENTION

Conventional trucks have rear view mirrors mounted either on the doors themselves or on the cab portion of the truck. Although mirror systems are adequate when the truck is used for towing conventional trailers or hauling normal size loads, such mirror systems are not adequate for safe towing of over-sized objects (such as trailer houses) or for hauling exceptionally wide objects (such as heavy equipment, for example). In such cases the primary, permanently mounted, mirrors do not extend outwardly from the truck a sufficient distance to enable the driver to see past the object being towed or hauled. As a result, serious safety problems are presented.

Various attempts have been made to mount auxiliary or temporary rear view mirrors to a vehicle. For example, some have involved fastening a mirror to the end of a rod which is then taped or tied to the frame of the primary mirror system. However, such a means for fastening and supporting an auxiliary mirror is very unsatisfactory since it does not securely support the auxiliary mirror. Consequently, because of wind resistance, etc. the auxiliary mirror can vibrate and can even become displaced from the desired placement.

Other types of auxiliary mirror systems also have been proposed. See, for example, U.S. Pat. Nos. 3,118,965; 3,778,016; 3,166,197; 4,111,532; 4,073,461; 3,790,117; 3,857,539; Design Pat. Nos. 213,772, 204,188, and 259,415; and U.S. Pat. No. 4,504,118. Some of the previously described systems are designed for attachment of an auxiliary mirror to the fender of a vehicle. Other such systems are intended for attachment to existing mirror systems.

However, there has not heretofore been described an auxiliary mirror system of the type provided by the present invention.

SUMMARY OF THE INVENTION

In accordance with the present invention there is provided an auxiliary mirror system which is adapted to be detachably mounted to a vehicle having a primary mirror secured to the vehicle by means of a frame member.

The auxiliary mirror system of the invention comprises:
- (a) an elongated mounted bracket adapted to be secured to the frame member;
- (b) first and second attachment means secured to the elongated mounting bracket;
- (c) an elongated arm having inner and outer ends, the inner end being adapted to be detachably mounted to the first attachment means on the mounting bracket;
- (d) an auxiliary mirror secured to the outer end of the elongated arm;
- (e) a first brace member having inner and outer ends, the inner end being detachably mounted to the second attachment means on the mounting bracket; the outer end being connected to the elongated arm;
- (f) a second mounting bracket adapted to be secured to the vehicle (e.g., to the door or to the frame supporting the primary mirror); and
- (g) a second brace member having inner and outer ends; the inner end being detachably mounted to the second mounting bracket; and the outer end being connected to the elongated arm.

The novel auxiliary mirror system can be easily and quickly attached to the primary mirror system when it is required, and it can also be easily and quickly detached when it is no longer required. The system is very stable and firmly supported when it is attached to the frame of the primary mirror.

BRIEF DESCRIPTION OF THE DRAWINGS

The invention is described in more detail hereinafter with reference to the accompanying drawings wherein like reference characters refer to the same parts throughout the several views and in which.

DETAILED DESCRIPTION OF THE INVENTION

Figure 1:
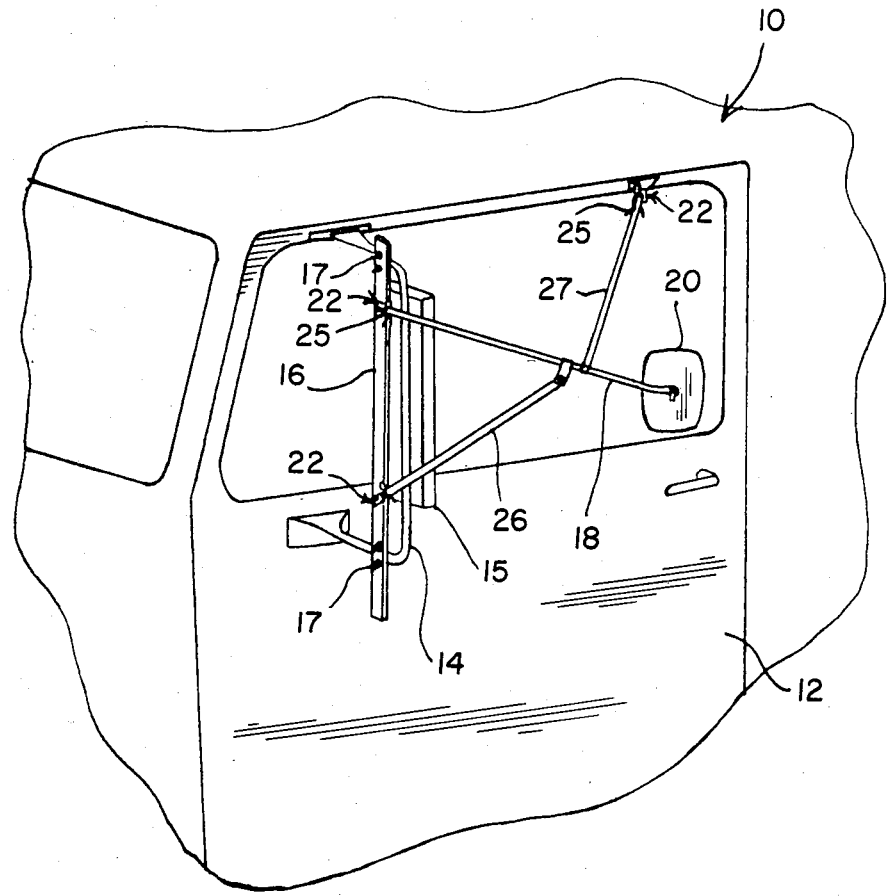
FIG. 1 is a perspective view of one embodiment of auxiliary mirror system of the invention mounted onto a vehicle having one style of a primary mirror thereon.

In FIG. 1 there is shown a perspective view of one embodiment of an auxiliary mirror system of the invention which is detachably mounted to the frame 14 holding primary mirror 15 on vehicle 10. Frame 14 is permanently attached to the door 12 of vehicle 10, and primary mirror 15 is secured to the frame 14.

Elongated mounting bracket 16 is secured to frame 14, preferably in a vertical manner as illustrated. Bracket 16 may be secured to frame 14 with U-bolts 17, as shown, or other equivalent means if desired. Preferably bracket 16 is secured to the top and bottom of the frame 14 so that it is extremely stable and firmly supported.

Figure 4:
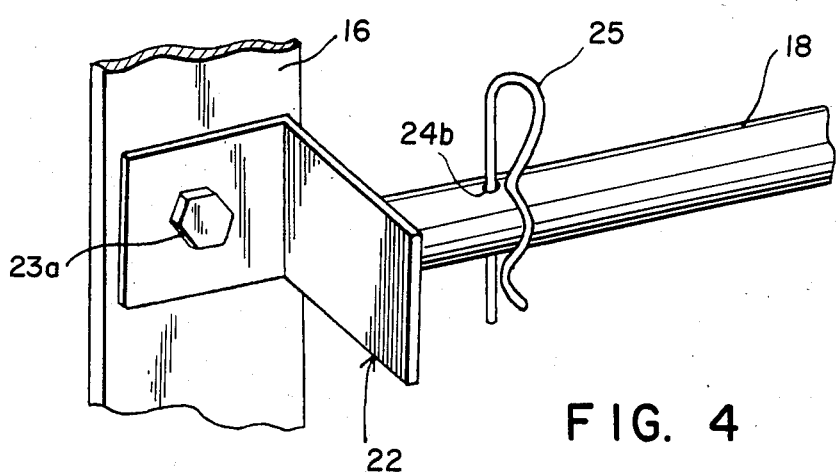
FIG. 4 is a perspective view showing one manner in which elongated arm 18 is detachably secured or attached to mounting bracket 22.
Figure 3:
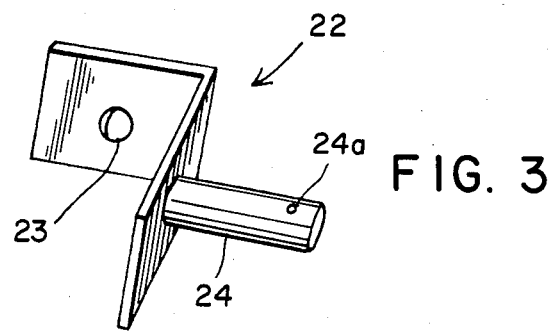
FIG. 3 is a perspective view of one type of attachment means which is useful in the present invention.

Elongated arm 18 is detachably mounted at its inner end to bracket 16 in the manner shown in FIG. 4. Auxiliary mirror 20 is secured to the outer end of arm 18. Attachment means 22 is securely fastened to bracket 16 by means of bolt 23a. FIG. 3 is a perspective view of a preferred attachment means 22 which is a right angle member to which shank 24 is permanently secured (e.g., by means of welding). Aperture 24a extends transversely through shank 24. Aperture 23 in one portion of the attachment means is adapted to receive bolt 23a for securement to mounting bracket 16.

Elongated arm 18 is preferably tubular so that its inner end may slidably engage shank 24 of attachment means 22. Arm 18 also includes aperture 24b which is adapted to register with aperture 24a in shank 24. Thus, after the inner end of arm 18 slidably engages shank 24, clip member 25 may be slipped through registering openings 24a and 24b in the shank and arm 18, respectively, to retain arm 18 onto attachment means 22.

Brace members 26 and 27 are secured at their outer ends to elongated arm 18. The inner end of brace 26 is detachably mounted to bracket 16 by attachment means 22. Brace 26 slidably engages shank 24, and a clip member as shown in FIG. 4 retains brace 26 onto the shank 24 of attachment means 22. Brace 26 supports arm 18 to prevent it from sagging or being forced upwardly.

Brace member 27 is detachably mounted at its inner end to an attachment means 22 which has been secured to the top of door 12. Clip 25 retains brace 27 onto the shank of the attachment means in the same manner as described above with respect to brace 26 and elongated arm 18. Brace 27 supports arm 18 to prevent it from moving either forwardly or rearwardly (even against air resistance at high speed).

Thus, the auxiliary mirror 20 is firmly and stably supported by arm 18 and brace members 26 and 27. In this manner mirror 20 does not vibrate or become displaced by wind or other forces when it is mounted in the manner described herein. Yet the auxiliary mirror system is easily and quickly detached when it is no longer required by removing clip members 25 from the inner ends of brace members 26 and 27 and arm 18. Bracket 16 may be left secured to frame 14. Then when it is desired to detachably mount the auxiliary mirror it is only necessary to slide the inner ends of braces 26 and 27 and arm 18 onto the respective attachment means and insert the retention clips, as described above.

Figure 2:
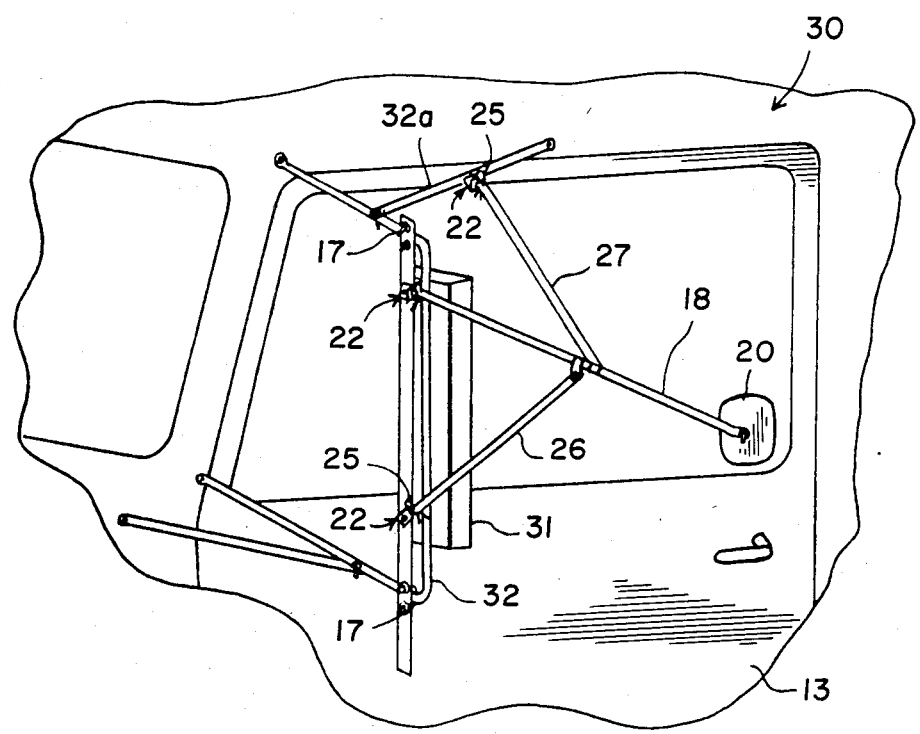
FIG. 2 is a perspective view of another embodiment of auxiliary mirror system of the invention mounted onto the frame of another style of a primary mirror on a vehicle.

In FIG. 2 there is illustrated another embodiment of auxiliary mirror system of the invention which is detachably mounted to vehicle 30. Primary mirror 31 is supported by frame 32. Strut 32a is connected between the frame 32 and the cab of vehicle 30. In this embodiment the inner end of brace 27 is detachably mounted to attachment means 22 carried by strut member 32a. Accordingly, it is not necessary to affix any portion of the auxiliary mirror system to door 13.

The brace members and the elongated arm for supporting the auxiliary mirror system of the invention are preferably tubular (e.g., stainless steel or aluminum). If desired, the braces and the elongated arm member could be made of solid material but this would add unnecessary weight.

The length of the elongated arm on which the auxiliary mirror is mounted may vary, as desired. For example, it may be about two feet long. Preferably the arm is sufficiently long to enable the driver of the vehicle to view past the sides of an over-sized load being towed or hauled. The diameter of the elongated arm and the brace members may also vary, although a diameter of about ⅜ inch is satisfactory. It is also preferable to include an auxiliary mirror system of the invention on each side of the vehicle.

Other variants are possible without departing from the scope of the present invention. For example, additional brace members may be included, although they are not necessary. Also, other equivalent means may be used for detachably mounting the braces and the elongated arm to the mounting bracket. If desired, the elongated arm to which the auxiliary mirror is attached may be adapted to telescope.

In another variation, one or both ends of the mounting bracket may be secured to the frame for the primary mirror by means of two U-bolts and a plate member. The two U-bolts fit over the frame for the primary mirror and the mounting bracket is positioned against the frame between the U-bolts; then the plate member extends across the mounting bracket and is secured to the U-bolts. In this manner the mounting bracket may be secured to the frame without the necessity for providing holes through the bracket.

What is claimed is:

1. An auxiliary mirror system adapted to be detachably mounted to a vehicle having a primary mirror secured to said vehicle by means of a frame member, said auxiliary mirror system comprising:
    (a) an elongated mounting bracket adapted to be secured to said frame member;
    (b) first and second attachment means secured to said elongated mounting bracket;
    (c) an elongated arm having inner and outer ends, said inner end being adapted to be detachably mounted to said first attachment means on said mounting bracket;
    (d) an auxiliary mirror secured to said outer end of said elongated arm;
    (e) a first brace member having inner and outer ends, said inner end being detachably mounted to said second attachment means, on said mounting bracket; said outer end being connected to said elongated arm;
    (f) a second mounting bracket adapted to be secured to said vehicle; and
    (g) a second brace member having inner and outer ends; said inner end being detachably mounted to said second mounting bracket; and said outer end being connected to said elongated arm.

2. An auxiliary mirror system in accordance with claim 1, wherein said elongated mounting bracket is adapted to be secured vertically to said frame member by means of U-bolts.

3. An auxiliary mirror system in accordance with claim 1, wherein said second mounting bracket is adapted to be secured to the door of said vehicle to which said frame member is secured.

4. An auxiliary mirror system in accordance with claim 1, wherein said second mounting bracket is adapted to be secured to said frame member.

5. An auxiliary mirror system in accordance with claim 1, wherein said first and second attachment means comprise elongated shanks.

6. An auxiliary mirror system in accordance with claim 1, wherein said elongated arm and said first and second brace members are tubular.

7. An auxiliary mirror system in accordance with claim 5, wherein said inner end of said elongated arm is adapted to slidably engage said shank of said first attachment means, and wherein said shank and said inner end of said elongated arm include registering apertures.

8. An auxiliary mirror system in accordance with claim 7, wherein a clip member is adapted to be removably inserted into said registering apertures.

9. An auxiliary mirror system in accordance with claim 1, wherein said second mounting bracket includes an elongated shank.

10. An auxiliary mirror system in accordance with claim 2, wherein said elongated arm is adapted to be mounted horizontally with respect to said frame member.

11. An auxiliary mirror system in accordance with claim 1, wherein said second attachment means is below said first attachment means.

12. An auxiliary mirror system adapted to be detachably mounted to a vehicle having a primary mirror secured to said vehicle by means of a frame member, said auxiliary mirror system comprising:

(a) an elongated mounting bracket adapted to be secured vertically to said frame member;

(b) first and second attachment means secured to said elongated mounting bracket; each said attachment means comprising an elongated shank; wherein said second attachment means is below said first attachment means;

(c) an elongated arm having inner and outer ends, said inner end being adapted to be detachably mounted to said shank of said first attachment means on said mounting bracket;

(d) an auxiliary mirror secured to said outer end of said elongated arm;

(e) a first brace member having inner and outer ends, said inner end being detachably mounted to said shank of said second attachment means; said outer end being connected to said elongated arm;

(f) a second mounting bracket adapted to be secured to said vehicle; said second mounting bracket comprising an elongated shank; and (g) a second brace member having inner and outer ends; said inner end being detachably mounted to said shank of said second mounting bracket; and said outer end being connected to said elongated arm.

13. An auxiliary mirror system in accordance with claim 12, wherein said second mounting bracket is adapted to be secured to the door of said vehicle to which said frame member is secured.

14. An auxiliary mirror sysrem in accordance with claim 12, wherein said second mounting bracket is adapted to be secured to said frame member.

15. An auxiliary mirror system in accordance with claim 12, wherein said elongated arm and said first and second brace members are tubular.

16. An auxiliary mirror system in accordance with claim 12, wherein said inner end of said elongated arm is adapted to slidably engage said shank of said first attachment means, and wherein said shank and said inner end of said elongated arm include registering apertures.

17. An auxiliary mirror system in accordance with claim 16, wherein a clip member is adapted to be removably inserted into said registering apertures.

18. An auxiliary mirror system in accordance with claim 12, wherein said elongated arm is adapted to be mounted horizontally with respect to said frame member.

19. An auxiliary mirror system in accordance with claim 12, wherein said elongated arm and said first and second brace members comprise stainless steel tubing.

* * * * *